United States Patent

Kottnauer et al.

Patent Number: 5,283,803
Date of Patent: Feb. 1, 1994

[54] ELECTRODE ASSEMBLY FOR GLASS MELTING FURNACE

[75] Inventors: Cenek A. Kottnauer, West Vancouver, Canada; Albert Lewis, Covina, Calif.

[73] Assignee: Glass Incorporated International, Chino, Calif.

[21] Appl. No.: 890,833

[22] Filed: Jun. 1, 1992

[51] Int. Cl.⁵ .......................... C03B 5/027; H05B 7/10
[52] U.S. Cl. .......................................... 373/36; 373/38; 373/94; 373/101
[58] Field of Search .................... 373/27–30, 373/36–39, 41, 93, 94, 100, 101

[56] References Cited

U.S. PATENT DOCUMENTS

| | | | |
|---|---|---|---|
| 1,406,741 | 2/1922 | Lonergan | 373/100 |
| 2,071,937 | 2/1937 | Payne | 373/100 |
| 2,086,148 | 7/1937 | Young | 373/100 |
| 2,591,709 | 4/1952 | Lubatti | 373/54 |
| 3,402,249 | 9/1968 | Blumenfield et al. | 373/37 |
| 3,576,385 | 4/1971 | Robinson | 373/36 |
| 3,988,138 | 10/1976 | Rough | 373/36 |
| 4,110,548 | 8/1978 | Dresch et al. | 373/101 |
| 4,287,380 | 9/1981 | Fairbanks et al. | 373/36 |
| 4,397,028 | 8/1983 | Dunn et al. | 373/94 |
| 4,422,172 | 12/1983 | Dunn et al. | 373/94 |
| 4,646,317 | 2/1987 | Evensen | 373/101 |
| 4,653,066 | 3/1987 | Phillips | 373/94 |
| 4,672,628 | 6/1987 | Hill | 373/93 |
| 4,965,812 | 10/1990 | Sorg et al. | 373/36 |

Primary Examiner—Bruce A. Reynolds
Assistant Examiner—Tu Hoang
Attorney, Agent, or Firm—Boniard I. Brown

[57] ABSTRACT

An electrode assembly for a glass melting furnace has an electrode body supported by two elongated steel tubes. Current is supplied to the electrode body by a current supply tube disposed between the two support arms. A holding fixture joins the two support arms to the electrode body. The tube extends through the holding fixture to connect with the electrode body, thus to provide a firm electrical connection with the tube and good mechanical connection with the support arms.

12 Claims, 2 Drawing Sheets

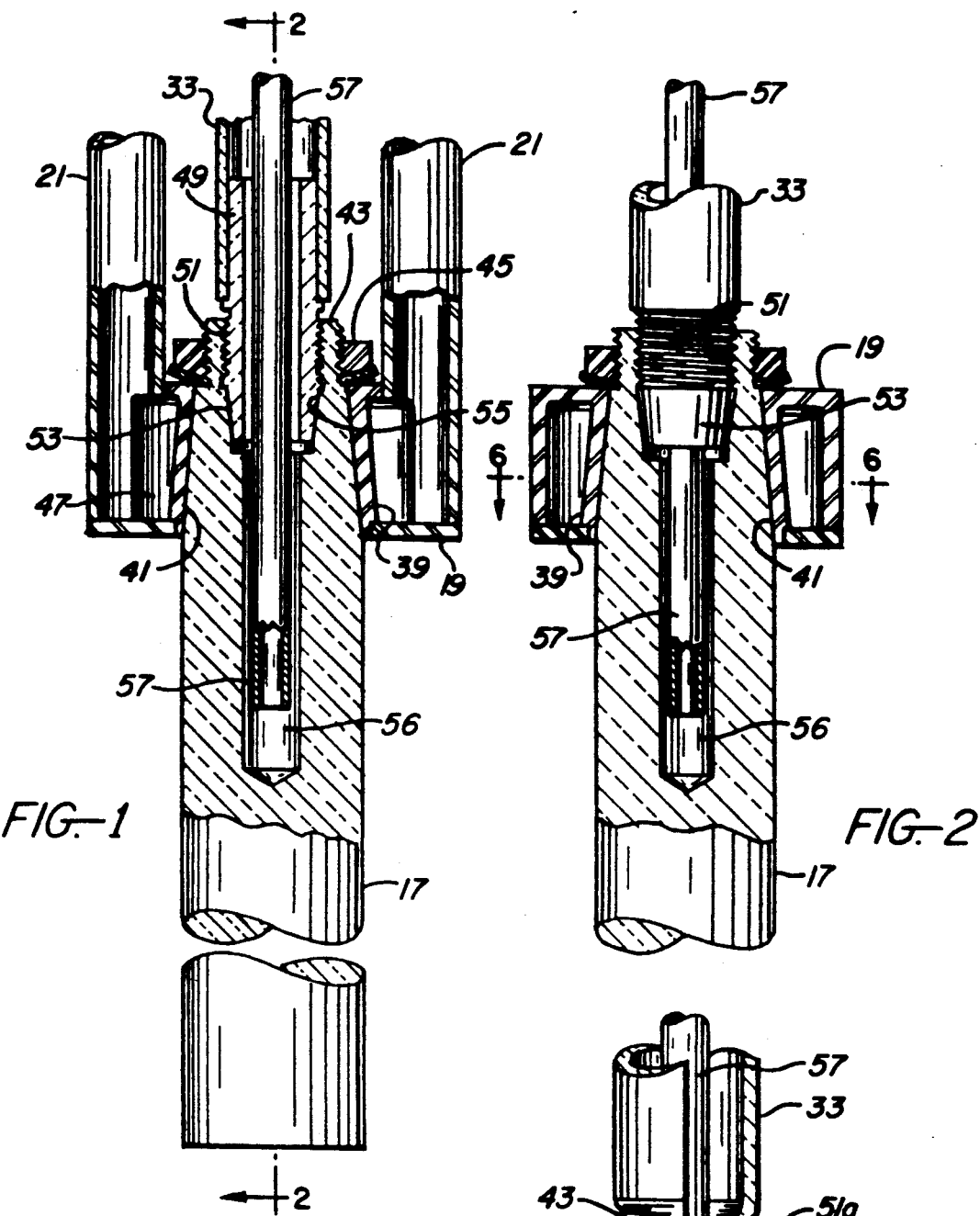
FIG.-1
FIG.-2
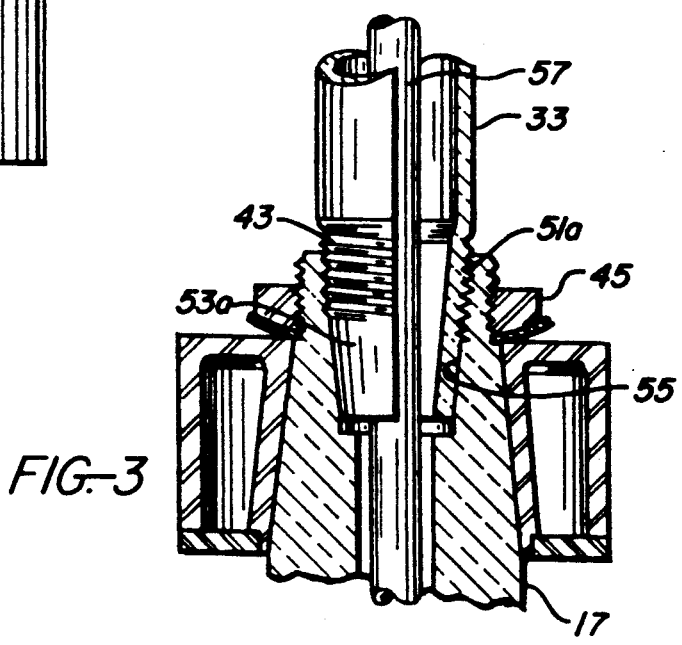
FIG.-3

ELECTRODE ASSEMBLY FOR GLASS MELTING FURNACE

BACKGROUND OF THE INVENTION

1. Field of the Invention

The present invention relates to an electrode assembly for a glass melting furnace. The furnace may be an upwardly open chamber formed of a refractory material for containment of glass to be melted. The electrode assembly has an elongated electrode body preferably of molybdenum to deliver electrical current to the glass in the furnace to heat the glass to a molten condition. The invention relates particularly to means for supporting the electrode and cooling the electrode.

2. Prior Art

U.S. Pat. No. 2,591,709 to Lubatti relates to a furnace for melting metal, wherein the metal is heated by an electrode suspended from an elongated hollow arm structure above the metal surface. The arm structure is connected to an electrical current source for supplying current to the electrode. Current radiates from the electrode through the metal in the furnace to heat and melt the metal.

The Lubatti patent relates to water-circulation means for cooling a current-carrying arm; water flows through a small diameter pipe extending within the arm. Water is discharged from the small diameter pipe into the end of the arm structure connected to the electrode, whereby the water then flows in a reverse direction through the annular space between the small diameter pipe and the inner surface of the arm structure which is hollow. The flowing water cools the hollow arm structure, thereby preventing overheating of the arm structure.

U.S. Pat. No. 4,965,812 to Sorg, et al. relates to a variation of the Lubatti apparatus applied to a glass melting furnace. Sorg, et al. describes apparatus wherein a current supply arm structure is a steel tube having a copper lining. The steel provides mechanical strength, and the copper lining provides the current conductivity.

A disadvantage of the Sorg, et al. apparatus is that the weight of the electrode is transmitted to the steel portion of the tube through the copper lining. There is danger that the copper will be distorted and adversely affect the current-carrying function and service life of the tube structure. Another disadvantage of the steel-copper composite tube is that the steel increases the overall electrical resistance of the tube so that less current is available to the electrode (unless the copper lining has a very large wall thickness).

A further disadvantage of the steel-copper composite tube is that the steel acts as a barrier to the escape of radiant heat from the outer surface of the copper lining so that relatively large coolant flow is required to maintain the copper lining at a satisfactory temperature range with minimal temperature variation in the copper). A related disadvantage is that copper has a significantly higher coefficient of thermal expansion than steel, so that there can be produced thermally-induced stresses in the composite tube, with potentially shortened tube service life. Relatively high cost of the composite tube is a further disadvantage.

SUMMARY OF THE INVENTION

The present invention relates to an electrode assembly for a glass melting furnace, wherein the mechanism for delivering current to the electrode body is separate from the mechanism which supports the electrode body. Electrode support is preferably provided by two spaced-parallel elongated support arms connected to a holding fixture for the electrode body, each support arm is preferably a steel tube. The current supply is provided by an elongated current supply tube (preferably formed of copper) disposed between the steel support arms. The current supply tube extends through the holding fixture for direct connection to the electrode body.

Separate coolants are provided for the current supply tube and the two support arms or tubes, whereby the coolant flows are separately controlled to maintain the two tube structures at different temperatures appropriate to their capabilities and functions. The steel tubes generally have higher temperatures than the copper current supply tube.

BRIEF DESCRIPTION OF THE DRAWINGS

FIG. 1 is a fragmentary sectional view of an electrode assembly according to the present invention;

FIG. 2 is a sectional view taken at line 2—2 in FIG. 1;

FIG. 3 is a fragmentary sectional view showing a modified form of electrode assembly according to the invention;

DESCRIPTION OF A PREFERRED EMBODIMENT OF THE INVENTION

Figure 4:
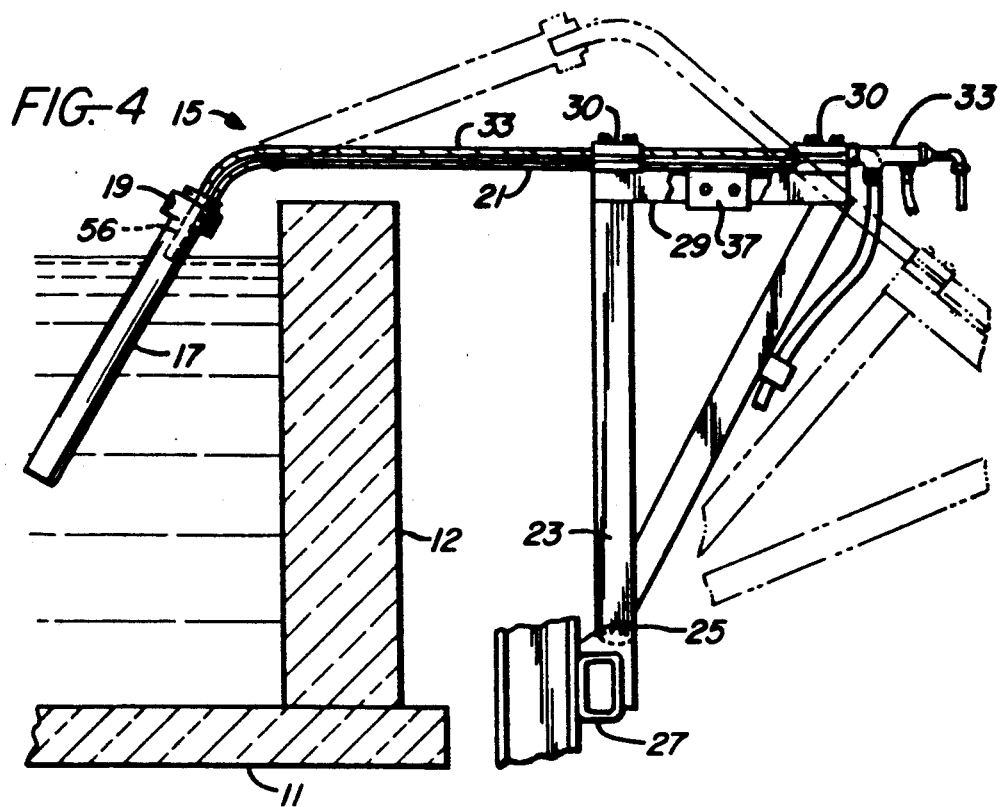
FIG. 4 is a side elevational view of the electrode assembly of FIG. 1, showing a mounting mechanism for supporting the electrode assembly for movement into or out of a glass melting furnace.

Referring to FIG. 4, there is fragmentarily shown a glass melting furnace formed of a refractory material, and having a bottom wall 11 and side wall 12. Glass raw stock is charged into the furnace to approximately the level indicated in FIG. 4. The level may vary somewhat during the course of the glass melting operation.

The glass is electrically heated and melted by one or more electrode assemblies 15. The electrode assembly is illustrated in two positions. As shown in full lines, the electrode body 17 of the assembly extends downwardly into the glass to be melted. Electrical current is supplied to the electrode body to raise its temperature and provide a high electrical potential on the surface of the electrode body. Current radiates through the raw stock in which the electrode body is immersed, thereby heating the glass to a molten state.

Figure 5:
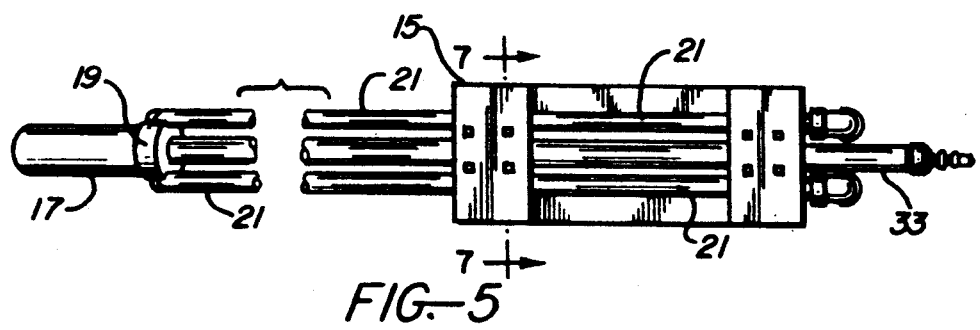
FIG. 5 is a top plan view of the electrode assembly of FIG. 4.

Electrode body 17 is attached to a holding fixture 19 welded or otherwise attached to two elongated support arms 21. Each support arm is preferably a steel tube. FIG. 4 shows one of the support arms, and FIG. 5 shows both of the support arms in plan view. The two elongated support arms 21 are clamped or otherwise attached to a triangular-shaped framework or cradle 23 which has its lower end pivotably connected, as at 25, to a stationary beam or other fixed structure 27.

As shown in FIG. 4, cradle 23 can be swung about the horizontal pivot axis 25 toward or away from the furnace to move the electrode assembly into or out of the furnace. FIG. 4 shows the electrode assembly in two positions, i.e., inserted into the furnace (full lines) and partially withdrawn from the furnace (broken lines). The electrode assembly may have other positions, as necessary to position the electrode body 17 at different desired insertional depths within the furnace, or to withdraw it fully from the furnace for replacement of the electrode body 17. The cradle means may be moved manually or by a power mechanism, such as a motor or fluid cylinder (not shown).

Figure 7:
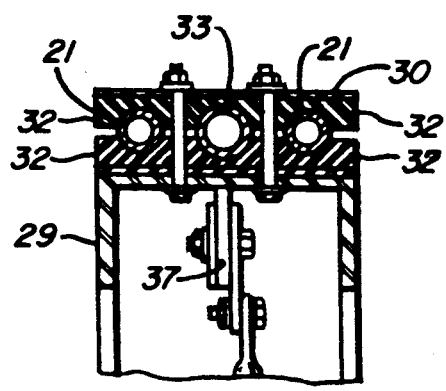
FIG. 7 is a sectional view taken on line 7—7 in FIG. 5.

FIGS. 4 and 7 shows a representative mechanism for attaching the two support arms 21 to cradle 23. The cradle includes a channel 29 and two clamp assemblies 30. Each clamp assembly includes two clamp sections 32 having opposed recesses therein to receive therebetween the two arms 21. Each arm 21 is a circular steel tube extending through the clamp sections. Conventional nut and bolt assemblies clamp the steel tubes to the clamp sections and indirectly to channel 29. Clamp sections 32 are formed of dielectric material.

Figure 6:
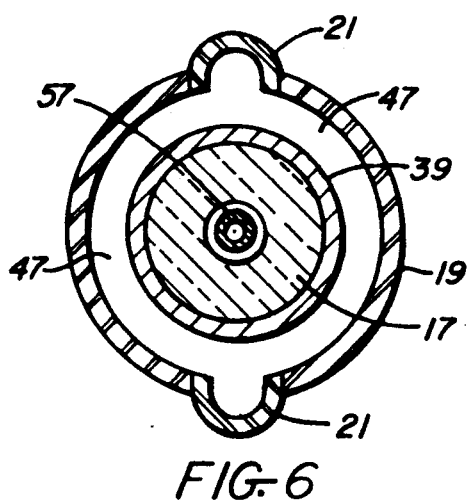
FIG. 6 is a sectional view taken on line 6—6 in FIG. 2.

As shown in FIG. 6, the clamp assemblies also serve to mount an elongated tube 33 midway between the two steel tubes 21. Tube 33 is preferably formed of copper or other appropriate conductive material, whereby the tube serves to conduct electrical current to electrode body 17. The dielectric clamp sections 32 electrically insulate the current supply tube 33 from the two support tubes or arms 21. Current can be supplied to tube 33 through a plate-type terminal 37 depending from the tube approximately midway between the two clamp assemblies 30.

FIGS. 1 and 2 show structural details of the holding fixture 19 used to attach electrode body 17 to the two steel support tubes 21. The holding fixture comprises an annular steel housing having an inner annular wall 39 defining a tapered frusto-conical socket surface 41. The upper end portion of electrode body 17 has a tapered outer side surface mated to socket surface 41, and an externally threaded section 43 extending above the plane of the annular housing. A nut 45 is threaded onto section 43 to removably clamp the electrode body to holding fixture 19.

The annular housing surrounds the upper end portion of the electrode body to define an annular coolant passage 47 interconnecting the two steel tubes 21. Water or other coolant is supplied to one of the steel tubes for passage through that tube into collant passage 47. The water extracts heat from annular wall 39, and flows out through the other steel tube. Wall 39 has a constant thickness around the inner circumference of the annular housing, whereby heat is extracted essentially evenly from the electrode body through and about the wall 39 circumference.

As shown in FIGS. 1 and 2, the free end of copper tube 33 has an electrical connector plug 49 extending into a socket defined in the upper end portion of electrode body 17. The conductive plug has an externally threaded section 51 and a frusto-conical section 53. The mating recess in the electrode body defines a frusto-conical socket surface 55 and an internally threaded mouth surface. Conductive plug 49 is fixedly attached to tube 33, e.g., by brazing.

Electrode body 17 may be attached to copper tube 33 by screwing its threaded end onto the threaded section 51 of plug 49. This operation is performed prior to the operation of tightening nut 45 on the threaded section 43 of the electrode body. Nut 45 is tightened onto section 43 after the electrode body has been fully screwed onto annular plug 49.

FIG. 3 illustrates a modified electrode assembly wherein current supply tube 33 has an external threaded portion 51a and a frusto-conical portion 53a sized to fit closely within the mating recess 55 in the electrode body. The electrode body 17 is attached to tube 33 by threaded engagement of threaded portion 51a with the internally threaded surface of the recess 55 in the electrode body. As with the electrode assembly of FIGS. 1 and 2, the electrode body 17 and tube 33 are assembled together prior to the tightening of nut 45 on threaded section 43 of the electrode body.

Tube 33 is clamped in place by the two clamp assemblies 30 (FIG. 4). However, the elongated portion of the tube between the leftmost clamp assembly 30 and the free end of the tube (plug 49) is unconnected to other structures. Therefore, when the electrode body 17 is inserted into the socket formed by annular wall 39 (FIGS. 1 and 2), the copper tube 33 can flex or bend transversely so that plug 49 is centered relative to frusto-conical surface 53 on the electrode body. Tube 33 has good electrical connection with the electrode body. At the same time, the electrode body has a strong mechanical connection with socket wall 39.

The electrode body 17 has therein an elongated cylindrical recess 55 extending an appreciable distance therealong. As shown in FIG. 4, the recess extends to a point below the glass surface level in the furnace. Water or other coolant is circulated through recess 55 to internally cool the exposed portion of the electrode body, i.e., the portion of the electrode body not immersed in the glass. As previously mentioned, the exposed portion of the electrode body is also cooled by the flow of coolant through annular passage 49.

Coolant is supplied to recess 55 by a small diameter coolant duct 57 extending through copper tube 33 into the recess 55. The lower end of duct 57 is open so that the coolant may flow upwardly back through the recess into the annular space 56 between duct 57 and tube 33. The outflowing coolant cools tube 33.

The illustrated electrode assembly provides an extensive coolant action for the electrode body and the copper tube 33. Both the internal surface and the external surface of the electrode body are cooled. A principal advantage of the electrode assembly is that electrode body 17 is mechanically supported by two arms or steel tubes 21 which are separate from the current supply tube 33. Each tube structure may be sized, configurated and designed to perform its individual function without compromising the performance of either tube structure.

Thus there has been shown and described a novel electrode assembly for glass melting furnace which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventors claim:

1. An electrode assembly for a glass melting furnace, comprising:

an elongated electrode body having a lower end portion insertable into the glass to be melted, and an upper end portion, a holding fixture telescopically engageable with the upper end portion of the electrode body, two elongated support arms spaced apart and connected with said holding fixture to support the electrode body while extended into the furnace, said support arms being movable as a unit for raising and lowering the electrode body, an elongated current supply tube extending alongside said support arms in a space between said support arms tubes, electrical connector means carried by said current supply tube for releasably gripping the upper end portion of the electrode body, whereby current is supplied to the electrode body through the connector means, said holding fixture comprising an annular housing with an inner annular surface defining a tapered socket, the upper end portion of said electrode body having a tapered outer side surface to engage to said socket, said electrode body having an externally threaded section extending upwardly from said tapered outer side surface, and a nut threaded onto said externally threaded section to clamp said holding fixture to said electrode body, said annular housing defining an annular coolant passageway surrounding said tapered socket, said support arms having end portions communicating with said coolant passageway at spaced points therealong, one of said support arms forming a coolant supply passage for delivering coolant to said annular passageway, and the other arm forming a coolant exhaust passage for removing coolant from said annular passageway, whereby the coolant removes heat from the tapered outer side surface of the electrode body.

2. An electrode assembly according to claim 1, wherein:

the inner annular surface of said annular housing is defined by an annular wall of constant thickness about an inner circumference of said annular housing, whereby heat is subtracted from the electrode body over an entire circumferential dimension of said annular wall.

3. An electrode assembly according to claim 1, and further comprising:

mounting means external to the glass melting furnace for swingably mounting the elongated support arms, whereby the electrode assembly is movable into or out of the glass melting furnace.

4. An electrode assembly according to claim 3, wherein:

said mounting means comprise external cradle means having an upper end attached to said support arms outside the glass melting furnace, and said cradle means has a lower end located an appreciable distance below the support arms, and horizontal axis pivot means at the lower end of said cradle means, whereby the electrode assembly is movable into or out of the glass melting furnace by swinging the cradle means in a vertical arc toward or away from the glass melting furnace.

5. An electrode assembly according to claim 1, wherein:

the upper end portion of said electrode body has an internally threaded surface, said current supply tube has an externally threaded section threadable into said internally threaded surface, whereby said electrode body is connected to said current supply tube, and further including a coolant duct extending within said current supply tube.

6. An electrode assembly for a glass melting furnace, comprising:

an electrode body having a lower end portion insertable into the glass to be melted, and an upper end portion, the upper end portion of said electrode body having a tapered socket therein, having a threaded mouth surface, said electrode body having an elongated recess extending from its upper end to a point below a glass surface in the furnace, a holding fixture telescopically engageable with the upper end portion of the electrode body, two elongated support arms spaced apart and connected with said holding fixture to support the electrode body while extended into the furnace, a current supply tube disposed between said support arms, a coolant duct extending within and downwardly beyon said current supply tube into said elongated recess, said duct and said current supply tube defining an annular coolant passage, whereby coolant is circulated through the electrode recess to remove heat from the electrode body electrical connector means carried by said current supply tube for releasably gripping the upper end portion of the electrode body, whereby current is supplied to the electrode body through the connector means, said electrical connector means comprising an annular plug element having an externally threaded section, whereby said electrode body is connected to said current supply tube by screwing the electrode body onto the externally threaded section of said annular plug element.

7. An electrode assembly according to claim 6, wherein said socket and said plug element have mating frusto-conical surfaces dimensioned to fit tightly together when the electrode body is screwed onto the plug element.

8. An electrode assembly for a glass melting furnace, comprising:

an electrode body having a lower end portion insertable into the glass to be melted, and an upper end portion, said electrode body having an elongated recess extending from its upper end to a point below a glass surface in the furnace, a holding fixture telescopically engageable with the upper end portion of the electrode body, two elongated support arms spaced apart and connected with said holding fixture to support the electrode body while extended into the furnace, a current supply tube disposed between said support arms, a coolant duct extending within and downwardly beyond said current supply tube into said elongated recess, said duct and said current supply tube defining an annular coolant passage, whereby coolant is circulated through the elongated recess to remove heat from the electrode body, electrical connector means carried by said current supply tube for releasably gripping the upper end portion of the electrode body, whereby current is supplied to the electrode body through the connector means, said electrical connector means comprise an externally threaded plug element extending from the current supply tube, and the upper end portion of said electrode body is internally threaded, whereby said electrode body is connected to said current supply tube by screwing the electrode body onto the externally threaded plug element.

9. An electrode assembly according to claim 8, wherein said current supply tube is flexible transversely of its length, whereby the electrode body has its upper end portion screwed onto the plug element while having a telescopic clamp fit in said holding fixture.

10. An electrode assembly for a glass melting furnace, comprising:

an electrode body having a lower end portion insertable into the glass to be melted, and an upper end portion, said electrode body having an elongated recess extending from its upper end to a point below a glass surface in the furnace, a holding fixture telescopically engageable with the upper end portion of the electrode body, two elongated support arms spaced apart and connected with said holding fixture to support the electrode body while extended into the glass melting furnace, a current supply tube disposed between said support arms, the upper end portion of said electrode body is internally threaded for threaded engagement of the electrode body with an externally threaded portion of the current supply tube, a coolant duct extending within and downwardly beyond said current supply tube into said elongated recess, said duct and said current supply tube defining an annular coolant passage, whereby coolant is circulated through the elongated recess to remove heat from the electrode body, electrical connector means carried by said current supply tube for releasably gripping the upper end portion of the electrode body, whereby current is supplied to the electrode body through the connector means, and said electrical connector means comprising an externally threaded portion of the current supply tube.

11. An electrode assembly according to claim 10, wherein said current supply tube is flexible transversely of its length, whereby the electrode body has its upper end portion screwed onto said threaded portion while having a telescopic clamp fit in said holding fixture.

12. An electrode assembly according to claim 10, and further comprising:

means external to the glass melting furnace for swingably mounting the elongated support arms, whereby the electrode assembly is movable into or out of the glass melting furnace.

* * * * *